United States Patent [19]

Crass et al.

[11] Patent Number: 4,758,396

[45] Date of Patent: Jul. 19, 1988

[54] PROCESS FOR THE PREPARATION OF A BIAXIALLY ORIENTED POLYPROPYLENE FILM

[75] Inventors: Guenther Crass, Taunusstein; Gunter Schloegl, Kelkheim; Lothar Bothe, Mainz-Gonsenheim; Herbert Peiffer, Mainz-Finthen, all of Fed. Rep. of Germany

[73] Assignee: Hoechst Aktiengesellschaft, Franfurt am Main, Fed. Rep. of Germany

[21] Appl. No.: 905,190

[22] Filed: Sep. 9, 1986

[30] Foreign Application Priority Data

Sep. 14, 1985 [DE] Fed. Rep. of Germany ....... 3532884

[51] Int. Cl.$^4$ ..................... B29C 47/06; B32B 27/08; B32B 31/30
[52] U.S. Cl. ..................... 264/145; 264/138; 264/171; 264/210.6; 264/211; 264/235.8; 264/288.8; 428/323; 428/330; 428/331; 428/343; 428/349; 428/516; 523/171; 524/492; 524/493; 524/497; 524/584; 524/586; 524/847; 524/849
[58] Field of Search .............. 264/41, 49, 210.6, 211, 264/235.8, 288.8, 138, 171, 154, 145; 428/323, 330, 331, 343, 347, 349, 516, 910; 523/171; 524/492, 493, 497, 584, 586, 847, 849; 525/240

[56] References Cited

U.S. PATENT DOCUMENTS

| | | | |
|---|---|---|---|
| 3,382,206 | 5/1968 | Karickhoff | 524/493 |
| 3,422,056 | 1/1969 | Carton | 524/584 X |
| 3,503,922 | 3/1970 | Carton | 524/493 |
| 4,101,050 | 7/1978 | Buckler et al. | 428/516 X |
| 4,303,708 | 12/1981 | Gebhardt et al. | 428/35 |
| 4,377,616 | 3/1983 | Ashcraft et al. | 428/323 X |
| 4,394,474 | 7/1983 | McKinney et al. | 264/210.6 X |
| 4,455,344 | 6/1984 | Matsuyama et al. | 428/327 |
| 4,560,614 | 12/1985 | Park | 428/516 X |
| 4,594,211 | 6/1986 | Mohnhaupt | 264/210.6 X |

FOREIGN PATENT DOCUMENTS

| | | | |
|---|---|---|---|
| 3002753 | 7/1981 | Fed. Rep. of Germany. | |
| 3436961 | 4/1986 | Fed. Rep. of Germany. | |
| 49-24136 | 6/1974 | Japan. | |
| 49-34746 | 9/1974 | Japan | 523/171 |
| 57-3840 | 1/1982 | Japan | 524/493 |
| 58-225135 | 12/1983 | Japan | 524/497 |
| 1508874 | 4/1978 | United Kingdom. | |

OTHER PUBLICATIONS

Kunststoffe, 72, (1982), 5, pp. 262–266.
Chemical Abstracts, vol. 82, 1975, 73958w, p. 37.

*Primary Examiner*—Jeffery Thurlow
*Assistant Examiner*—Leo B. Tentoni
*Attorney, Agent, or Firm*—Foley & Lardner, Schwartz, Jeffery, Schwaab, Mack, Blumenthal & Evans

[57] ABSTRACT

A process for the preparation of a biaxially stretch-oriented film having at least one opaque layer is described. The opaque layer is composed essentially of propylene polymer and fillers in a quantity of about 10 to 40% by weight, relative to the total weight of propylene polymer and fillers. In production, the granules are melted in a screw extruder, are forced through a die and are formed by cooling to give a preformed film. The preformed film is then stretch-oriented both along the machine direction and transversely perpendicular to the machine direction and is then heat-set. The fillers are added in the form of a masterbatch to the granules of unfilled polymers. The masterbatch should have a filler content of more than about 30% by weight.

17 Claims, No Drawings

PROCESS FOR THE PREPARATION OF A BIAXIALLY ORIENTED POLYPROPYLENE FILM

BACKGROUND OF THE INVENTION

The present invention relates to a process for the preparation of a biaxially stretch-oriented film having at least one opaque layer, composed essentially of a propylene polymer, preferably polypropylene, and fillers in a quantity of 10 to 40% by weight relative to the total weight of propylene polymer and fillers. In the process, granules are melted in a screw extruder, are forced through a die and are formed by cooling to give a preformed film which is then stretch-oriented both along the machine direction and transversely perpendicular to the machine direction and is then heat-set.

Films comprising a layer having a filler content of incompatible or hardly compatible organic or inorganic pulverulent materials are disclosed, for example, in German Auslegeschrift No. 2,814,311 and German Offenlegungsschrift No. 3,436,961. The films described in these publications are provided by the addition of the above-mentioned filler with an opaque appearance, show a high surface gloss, are heat-sealable or cold-sealable and, finally, can very readily be imprinted. The opacity of these films is produced during stretching of the coextruded film, the polymer matrix being torn open at the grain boundaries of the filler which is incompatible with the polypropylene. As a result, voids or microcavities are formed across the entire interior of the film, where the refraction of light differs from that on the polymer matrix. Due to the refraction or scattering of light in the region of these cavities, the film has an opaque appearance which is very effective in advertising and therefore desirable.

The films according to the state of the art are produced by known processes. The basic operations of the production process are represented by the process steps of extrusion (melting) of the raw materials for the base layer and covering layers, forming of the melt strands to give a flat film of melt and cooling of this film of melt to give a preformed film. In this case, the density of the preformed film is equal to the density calculated from that of the polymer material and of the filler. The film is then biaxially stretched sequentially, either first in the longitudinal direction and then in the transverse direction, or first in the transverse direction and then in the longitudinal direction, in a known manner (cf. German Auslegeschrift No. 2,814,311). The intervening steps, for example cooling of the film for solidification and reheating of the film to the stretching temperature, and the step following the last stretching, namely heat-setting, are also carried out in a known manner.

In this process hitherto used, the desired quantities by weight of organic or inorganic fillers are added to the polymer during the preparation of the raw material for the layer provided wtih fillers. This is done during granulation of the polypropylene powder, for example, in twin-screw extruders, where other additives, such as antioxidants, antistatic agents and/or stabilizers, are also added to the raw material, each in the optimum quantity.

For the purpose of film production, cylindrical granules having a diameter of 3 to 4 mm and a length of 4 mm, as is also customary for other applications, were employed originally. The processing of these granules having a filler content of more than 10% by weight of the incompatible material, together with the proportion economically required of regranulated material produced from reclaimed material arising during film manufacture, in the single-screw extruders conventional in industry was admittedly quite successful initially, but when the extrusion speed was raised, i.e., the extruder output was increased, fine bubbles appeared in the finished film and made the product useless. It was possible to identify the bubbles as air bubbles.

Surprisingly, these extremely undesirable bubbles were eliminated, for the case of raw material filled with up to 10% by weight, by changing over from cylindrical granules to lenticular granules, the lenticular granules having a diameter of about 5 to 6 mm and a thickness of about 2 to 3 mm. However, it was found that even this processing method is prone to faults since, from time to time at irregular intervals, bubble formation was again and again observed.

The improvement of the processability by the choice of lenticular granules in place of the otherwise conventional cylindrical material can be seen in the increase of the bulk density from 530 kg/m$^3$ on the average to 570 kg/m$^3$ at a conventional reclaimed material content of 30 to 40%, and also in an increase in the specific surface area of the packed material. Due to the larger surface area, the air present in the grain passes more rapidly into the grain interstices, when the material is heated in the extruder, from where it can be squeezed off toward the hopper. Of course, owing to the higher bulk density, less air is initially present in the system than in the case of a lower bulk density.

Although it is possible in principle that a removal of air present in the screw space can be carried out—at least partially—by means of so-called venting zones, vacuum hoppers or twin-screw extruders with venting facilities, these equipment modifications first of all make the existing equipment more expensive and, on the other hand, do not guarantee the desired result in every case. In addition, it is conventional and in many cases advantageous under process engineering aspects to carry out the extrusion of polypropylene films in single-screw extruders, preferably in single-screw extruders provided with grooves having a forced conveying action.

Processing of raw material having a content of more than 10% by weight of incompatible or hardly compatible organic or inorganic fillers to give bubble-free films by means of lenticular granules did not, however, succeed in a satisfactory manner, that is to say at throughput rates desirable for the production process. Mainly in the case of films of relatively large thickness (thickness greater than 50 μm), the surface of the films showed a more or less irregular bubble structure which it was not possible to eliminate completely even by optimization of the extrusion conditions (colder or warmer feed zone, preheating, i.e., temperature control with partial venting of the mixture of granules and reclaimed material). Film meeting the specifications and having a filler content of more than 10% by weight of the fillers has not yet been produced by the various processes used according to the state of the art.

SUMMARY OF THE INVENTION

It is therefore an object of the present invention to provide an improved process for producing biaxially oriented polymer film. It is also an object of the invention to provide a process, by means of which it is possible, in an economical manner, i.e., at a high production rate, to produce fully bubble-free opaque films which contain a quantity of filler of up to about 40 % by weight, relative to the total weight of the polymer and fillers.

Another object resides in providing a process for producing films of especially low density.

It is also an object of the invention to provide an improved polymer film having at least one opaque layer.

In accomplishing the foregoing objects, there has been provided according to one aspect of the present invention a process for the preparation of a biaxially stretch-oriented film having at least one opaque layer, comprising the steps of adding a filler in the form of masterbatch to granules of a polymer comprised predominantly of polymerized propylene to provide a composition containing from about 10 to 40% by weight of said filler relative to the total weight of said propylene polymer and filler; melting the composition; extruding the melted composition to form a sheet; cooling the extruded sheet; biaxially stretch-orienting the sheet; and heat setting the oriented sheet.

In accordance with another aspect of the present invention, there has been provided a single-ply opaque film having a total filler content in the range from about 10 to 40% by weight, relative to the total weight of propylene polymer and fillers, and having a maximum density of about 0.6 g/cm$^3$. There has also been provided a multi-ply film comprising an opaque layer of propylene polymer having a total filler content in the range from about 10 to 40% by weight, relative to the total weight of the opaque layer, and having a maximum density of about 0.6 g/cm$^3$, and which carries at least one further functional layer applied to at least one side.

Further objects, features and advantages of the present invention will become apparent from the detailed description of preferred embodiments which follows.

DETAILED DESCRIPTION OF THE PREFERRED EMBODIMENTS

The invention comprises a process of the generic type described at the outset, in which the fillers are added in the form of a masterbatch to the granules of unfilled polymers.

Within the scope of the present invention, the term masterbatch is to be understood as a stock mixture, in particular a granular dust-free concentrate of a plastic raw material with large quantities of fillers, which is used as an intermediate in compounding the material. For instance, it is used as an additive to unfilled granules before extrusion, in order to produce defined quantities of moldings which contain the filler. The masterbatch used according to the invention comprises more than about 30% by weight of fillers, preferably more than about 40% by weight, relative to the total weight of the polymers plus fillers, and is in the form of cylindrical or lenticular granules.

The fillers are the conventional inorganic or organic pulverulent materials incompatible with polypropylene. Inorganic fillers are preferred. Suitable inorganic fillers are alumina, aluminum sulfate, barium sulfate, calcium carbonate, magnesium carbonate, silicates such as aluminum silicate (kaolin clay) and magnesium silicate (talc), silica and/or titanium dioxide, of which calcium carbonate, silica, titanium dioxide or mixtures thereof are preferably used. Calcium carbonate (chalk) is particularly preferred. The mean particle size of the pulverulent filler is in the range from about 2 to 5 $\mu$m, preferably in the range from about 3 to 4 $\mu$m. The masterbatch can additionally also contain advantageous additives such as antioxidants, antistatic agents, dyes and/or stabilizers, each in an effective quantity.

If the masterbatch is in the form of cylindrical granules, the mean diameters of the cylinders are preferably in the range from about 1 to 2 mm and the mean length of the cylinders is in the range from about 0.5 to 1.5 mm. If the masterbatch is in the form of lenticular granules, the lentils should have a mean diameter in the range from about 1 to 3 mm and a mean thickness in the range from about 0.5 to 1 mm.

The polymer preferably employed within the scope of the present invention is an isotactic propylene homopolymer or a copolymer which is composed predominantly of propylene units. Such polymers usually have a melting point of at least about 140° C., preferably at least about 150° C. Isotactic polypropylene with an n-heptane-soluble fraction of less than about 15% by weight, copolymers of ethylene and propylene with an ethylene content of less than about 10% by weight and copolymers of propylene with other $\alpha$-olefins having 4 to 8 carbon atoms and containing less than about 10% by weight of these $\alpha$-olefins represent typical examples of the preferred polymers.

The preferred polymers advantageously have a melt index in the range from about 0.5 g/10 minutes to about 8 g/10 minutes at 230° C. and 2.16 kg load (DIN 53,735), in particular from about 1.5 g/10 minutes to about 4 g/10 minutes.

In the process according to the invention, the masterbatch is admixed, before the polymer granules are charged to the extruder, with the granules of unfilled polymers, i.e. polymers without a filler admixture, in such a quantity that the desired percentage by weight of fillers is obtained in the film. Preferably, the masterbatch is added to a mixture of unfilled granules and regranulated material. Within the scope of this invention, regranulated material is to be understood as granules which are produced by reprocessing of waste material and off-cut material (reclaimed material) arising during film production.

The films produced by the process according to the invention can be of single-ply structure, or they can be multi-ply laminates comprising a base film with further functional layers applied to one side or to both sides. To produce the opaque appearance of the films manufactured by the process according to the invention, the preformed film prepared by quenching of the plastic melt is stretch-oriented successively by a factor of about 5 to 7 in the longitudinal direction at a temperature from about 120° to 130° C. and by a factor of about 8 to 10 in the transverse direction at a temperature from about 160° to 170° C. In the case of a filler quantity in the range from about 10 to 40% by weight, relative to the total weight of the polypropylene and fillers, the single-ply film provided with fillers, or that layer of the multi-ply film which produces the opaque appearance, has typically a maximum density of about 0.6 g/cm$^3$, preferably from about 0.4 to 0.6 g/cm$^3$. The thickness of the films thus produced is usually from about 10 to 80 $\mu$m, preferably from about 20 followed by the process step of heat-setting, i.e., heat post-treatment of the film for the purpose of dimensional stabilization. The heat-setting is preferably carried out at a temperature in the range from about 150° to 160° C. for a duration of from about 0.5 to 10 seconds.

The functional layers in the case of a multi-ply film are as a rule heat-sealable or cold-sealable layers. They can also be non-sealable layers such as, for example, adhesion-promoting layers, dye coatings, in particular imprints, or metal coatings. All these layers can be present on one side or on both sides.

The heat-sealing layers are preferably layers of an ethylene homopolymer (high-density polyethylene or low-density polyethylene), a copolymer of propylene as the main component and ethylene, preferably in a maximum quantity of about 10% by weight (relative to the copolymer), a copolymer of propylene as the main component and but-1-ene, preferably in a quantity of about 10 to 15% by weight (relative to the copolymer), a terpolymer of propylene, ethylene and an α-olefin having 4 to 10 carbon atoms, preferably a terpolymer composed of from about 93.2 to 99.0% by weight of propylene, about 0.5 to 1.9% by weight of ethylene and about 0.5 to 4.9% by weight of an α-olefin having 4 to 10 carbon atoms, or of a mixture of these polymers. The comonomers are in an essentially random distribution in the polymers (cf. German Auslegeschrift No. 2,814,311). Suitable coldsealing layers are composed of polymers based on natural or synthetic rubber. The non-sealable covering layer is preferably composed of a corresponding propylene homopolymer.

The thickness of the heat-sealing layer is about 0.1 to 10 μm, preferably about 0.5 to 2 μm. The coldsealing layer and the non-sealable layers also have as a rule such a thickness. In the case of the multi-ply film with heat-sealing layers applied to one side or both sides, the multi-ply film is preferably produced by the co-extrusion process.

The addition of a masterbatch to the homopolymer results in a mixture which, as compared with the mixture according to the state of the art, has a substantially higher bulk density. If the mixture according to the state of the art has a bulk density of about 570 kg/m³, the comparable bulk material according to the invention, produced with the use of a masterbatch having a filler content of 50% by weight, has a bulk density of about 730 to 750 kg/m³. The increased bulk density is achieved mainly by the heavier, but very small grains of high filler content.

Surprisingly, two further very positive effects were achieved by the use of the masterbatch described, and these lead to a substantial improvement in the economics and the film quality of the films produced with this masterbatch.

By using the masterbatch, an increase in extruder output was obtained, specifically by approximately the extent of the increase in density. Although not intending to be bound therby, the following considerations are at present used as an explanation:

According to measurements on feed zones with grooves having a forced conveying action (see Kunststoffe 72 (1982) 5, 262–266), the mass throughput m, which is to be calculated for a given geometry from the screw diameter D and the speed of rotation n, is still dependent on the bulk density $\rho_s$:

$$\dot{m} = k \cdot \rho_s \cdot n \cdot D^3 \quad (1)$$

In the equation, K is a constant which, inter alia contains the friction coefficients of the polymer on the barrel and on the screw. Assuming that the mutual ratio of the friction coefficients of the polymer on the screw and barrel remains approximately constant when the masterbatch is added, the resulting mass throughput $_m$MB when the masterbatch is used is immediately obtained from $$\dot{m}^{MB} = \frac{\rho_s MB}{\rho_s} \cdot \dot{m}$$

$\rho_s$MB = bulk density with masterbatch
$\rho_s$ = bulk density without masterbatch If, for exmaple, ṁ is about 1000 kg/h, the throughput with the use of masterbatch is, with the numerical values for $\rho_s$ and $\rho_s$MB $$\dot{m}^{MB} = \frac{730}{570} \cdot 1000 = 1280 \text{ kg/h}.$$

The second positive effect is to be seen in a drastic reduction in the pressure fluctuations at the extruder outlet. Hitherto, fluctuating values of 3 to 4 bar have been measured at that point, but in the process according to the invention the maximum now is only 1 bar. As a result of using the masterbatch according to the invention, it is possible, surprisingly, to produce films with film properties, above all a greater uniformity of thickness, which means an enhanced process reliability and improved further processability of the film.

According to present knowledge, two explanations can be given for the fact that, by the process according to the invention, it is possible to advantageously produce bubble-free opaque films of low density. On the one hand, the increase in bulk density effects a better matching of the properties of the bulk material with the screw channel, but in particular with the barrel wall which usually is provided with grooves having a forced conveying action. Due to the great increase in the bulk density—as already explained—there is less air in the system than in comparable bulk material of low bulk density. The given compression by the extruder screw and the ratio of solid density and bulk density is therefore much better balanced than in the case of comparatively light packing.

The air contained in the bulk granules in an extruder can escape completely in the direction of the feed hopper only if it is ensured that the process of melting the polymer granules is absolutely complete in every case before the zone of highest pressure in the extruder barrel (end of the compression zone) is reached. The length of the melting zone remains approximately constant if the dwell time of the granules also remains constant. This will be checked below by reference to a calculation example.

The dwell time τ in the melting zone is:

$$\tau = \frac{V \cdot \rho_s}{\dot{m}} \quad (3)$$

V = screw channel volume
Using equation (1), the result is:

$$\tau = \frac{V}{K \cdot n \cdot D^3} \quad (4)$$

This shows that the dwell time τ of the polymer in the melting zone depends only on the extruder geometry (screw volume V, speed of rotation of the screw n and screw diameter D), but is independent of the bulk density $\rho_s$. For this reason, films without loss of quality (bubble formation) can be produced by an increase in bulk density, coupled with increased mass throughput at the same time.

The second reason is the better matching of the bulk material packing with the barrel grooving. Due to the smaller heavy granule grains, hooking of the bulk material in the grooving is far more random than in the case of low packing density. The pressure build-up in the bed of granules suffers less disturbance, so that the air can be squeezed off very rapidly in the direction of the hopper.

In Table 1, shown below, six samples will be used to demonstrate once again the cases in which bubble formation on the film surface can arise (symbolized by +) during film production, and when this can be avoided (symbolized by −). The masterbatch used in each case was composed of 50% by weight of polypropylene and 50% by weight of filler, the filler being calcium carbonate.

TABLE 1

| Mixture | Standard Form | Bubbles |
| --- | --- | --- |
| PP + 10% of pigment | Cylindrical granules | + |
| PP + 10% of pigment | Lenticular granules | +− |
| PP + 20% of pigment | Lenticular granules | ++ |
| PP + 10% of pigment + 10% via masterbatch but | Cylindrical/lenticular | + |
| PP + 10% of pigment via masterbatch | Cylindrical/lenticular | −− |
| PP + 20% of pigment via masterbatch | Cylindrical/lenticular | −− |

What is claimed is:

1. A process for the preparation of a biaxially stretch-oriented film having at least one opaque layer, comprising the steps of:
    adding a filler in the form of masterbatch to granules of a polymer comprised predominantly of polymerized propylene to provide a composition containing from about 10 to 40% by weight of said filler relative to the total weight of said propylene polymer and filler, and having a bulk density of greater than 570 kg/m$^3$;
    melting said composition;
    extruding the melted composition to form a sheet having at least one layer;
    cooling the extruded sheet;
    biaxially stretch-orienting the sheet; and
    heat setting the oriented sheet.

2. A process as claimed in claim 1, wherein the masterbatch comprises a filler proportion of more than about 30% by weight relative to the total weight of the masterbatch.

3. A process as claimed in claim 2, wherein the masterbatch comprises a filler proportion of more than about 40% by weight relative to the total weight of the masterbatch.

4. The process as claimed in claim 1, wherein the masterbatch comprises cylindrical granules having a mean cylinder diameter of from about 1 to 2 mm and a cylinder length of from about 0.5 to 1.5 mm.

5. A process as claimed in claim 1, wherein the masterbatch comprises lenticular granules having a mean diameter of from about 1 to 3 mm and a mean thickness of from about 0.5 to 1 mm.

6. A process as claimed in claim 1, wherein the masterbatch is added to a mixture of unfilled polymer granules and regranulated polymer material.

7. A process as claimed in claim 1, wherein the composition have a bulk density of from about 600 to 800 kg/m$^3$.

8. A process as claimed in claim 1, wherein the filler is an inorganic or organic pulverulent material incompatible with polypropylene.

9. A process as claimed in claim 1, wherein said filler has a particle size in the range from about 2 to 5 μm.

10. A process as claimed in claim 1, wherein said polymer is an isotactic propylene homopolymer or copolymer which comprises predominantly propylene units.

11. A process as claimed in claim 10, wherein said polymer has a melting point of at least about 140° C.

12. A process as claimed in claim 10, wherein said isotactic propylene homopolymer has an n-heptane-soluble fraction of less than about 15% by weight relative to the weight of the homopolymer.

13. A process as claimed in claim 10, wherein said copolymer is a copolymer of ethylene and propylene, having an ethylene content of less than about 10% by weight, or a copolymer of propylene and other α-olefins, having 4 to 8 carbon atoms and containing less than 10% by weight of a-olefins, relative to the weight of the copolymer.

14. A process as claimed in claim 1, wherein said polymer has a melt index in the range from about 0.5g/10 min to about 8g/10 min at 230° C. and 2.16kg load (DIN 53,735).

15. A process as claimed in claim 1, wherein said extruding step comprises co-extruding the melted composition with the melt of at least one functional material to form a multi-ply film having at least one functional layer.

16. A process as claimed in claim 15, wehrein said functional layer comprises a heat-sealable layer, a cold-sealable layer or a non-sealable layer.

17. A process as claimed in claim 1, wherein said stretch-orienting step comprises stretch-orienting successively by a factor of about 5 to 7 in the longitudinal direction at a temperature from about 120° to 130° C., and by a factor of about 8 to 10 in the transverse direction at a temperature from about 160° to 170° C.

* * * * *